United States Patent [19]
Aldrich et al.

[11] Patent Number: 5,502,819
[45] Date of Patent: Mar. 26, 1996

[54] CLOCK DISTRIBUTION SYSTEM FOR REDUCING CLOCK SKEW BETWEEN PROCESSORS IN A DUAL SIDED TIGHTLY COUPLED SYSTEM

[75] Inventors: Gregory Aldrich, San Jose; Stephen S. Si, Sunnyvale; Eugene T. Wang, Fremont, all of Calif.; Gary A. Woffinden, Rexburg, Id.

[73] Assignee: Amdahl Corporation, Sunnyvale, Calif.

[21] Appl. No.: 970,127

[22] Filed: Nov. 2, 1992

[51] Int. Cl.$^6$ ............................................. G06F 13/00
[52] U.S. Cl. ........................... 395/200.19; 364/DIG. 1; 364/DIG. 2; 364/270; 364/270.5; 364/271
[58] Field of Search ............. 364/DIG. 1 MS File, 364/DIG. 2 MS File; 395/200, 250, 325, 500, 550, 800, 200.19

[56] References Cited

U.S. PATENT DOCUMENTS 4,696,019  9/1987  Tulpule et al. .................... 375/107

Primary Examiner—Robert B. Harrell
Attorney, Agent, or Firm—Fliesler, Dubb, Meyer & Lovejoy

[57] ABSTRACT

A clock distribution system for reducing clock skew between tightly coupled central processing units in a multi-processor system. The multi-processor system includes (1) a configuration processor for generating a first configuration signal and a second configuration signal, a first clock, a second clock, (2) a first processor having a first central processing unit, (3) a second processor having a second central processing unit, (4) a first clock generator for generating a first delayed clock signal from the first or second clock in accordance with the configuration signals, and (6) a second clock generator generating a second delayed clock signal from the first or second clock in accordance with said configuration signals. The clock distribution system comprises a distribution means for receiving the first delayed clock signal, the second delayed clock signal and the configuration signals, and for distributing in accordance with the configuration signals either the first delayed clock to the first central processing unit and the second delayed clock to the second central processing unit, or the first delayed clock signal to both the first and second central processing unit or the second delayed clock signal to both the first and second central processing unit.

13 Claims, 3 Drawing Sheets

CLOCK DISTRIBUTION SYSTEM FOR REDUCING CLOCK SKEW BETWEEN PROCESSORS IN A DUAL SIDED TIGHTLY COUPLED SYSTEM

BACKGROUND

1. Field of the Invention

This invention relates to a clock distribution system for reducing CPU to CPU clock skew in a dual sided tightly coupled system.

2. Description of the Related Art

In a tightly coupled multi-processor system, all processors and the main memory storage run on clocks derived from the same oscillator. FIG. 1 illustrates a tightly coupled multi-processor system. Side 1 of the system comprises a local oscillator 10 providing a local clock on line 12 and a remote clock on line 11. The local clock is connected to the clock controller 13. The clock controller 13 distributes the clock via line to the frame distribution unit 16 which provides the clock to the master storage unit 21. Clock controller also distributes the clock via line 14 to delay 17 which then provides the clock via line 18 to CPU 20. Side 2 of the system comprises a local oscillator 30 which provides a remote clock on line 31 and a local clock on line 32. The local clock of oscillator 30 is connected to clock controller 33 which distributes the clock via line 35 to frame distribution unit 36 and then via line 39 to the master storage unit 41. The clock is also provided via line 34 to delay 37 which provides the clock via line 38 to CPU 40. Oscillator 10's remote clock is connected via line 11 to the clock controller 33 of side 2. Oscillator 30's remote clock is connected to clock controller 13 on side 1 by line 31. Configuration processor 9 controls the configuration of the tightly coupled system by providing to clock controller 13 a local clock selection signal LCL1 on line 22 and a remote clock selection signal RMT1 on lines 23 and by providing to clock controller 33 a local clock selection signal LCL2 on line 42 and a remote clock selection signal RMT2 on line 43.

Where both sides of the system are to operate independently, then configuration processor 9 provides the local clock selection signals LCL1 and LCL2 on lines 22 and 42 to clock controllers 13 and 33, respectively. Under this condition, side 1 will use the local clock of oscillator 10 and side 2 will use the local clock of oscillator 30.

Where both sides of the system are to operate using oscillator 10, then the configuration processor 9 will provide a local clock selection signal LCL1 22 to clock controller 13 and a remote control selection signal RMT2 on line 43 to clock controller 33. In this configuration the remote clock of local oscillator 10 will be used by side 2 and the local clock of oscillator 10 will be used by side 1.

Typically, the clocks are cross coupled immediately after the oscillators because of the physical distances of the frames that house the various units comprising the systems. The master storage unit clock is sent to the frame distribution unit and therefrom to the master storage units. The clock for the CPU is delayed to match the delay in the clock reaching the memory storage unit on the same side of the system signal. Since the master storage unit is far away from the central processing unit, the delay to match the master storage unit clock is large. Further tuning errors, cable and processing variations will cause the clocks to be skewed between the central processing units even though a delay has been used to compensate for the time difference between the CPU and memory storage unit on each side of the system. It is desirable to minimize the clock skew between the central processing units on the two sides of the system.

SUMMARY OF THE INVENTION

Accordingly, it is an object of the present invention to provide a clock distribution system in a tightly coupled dual sided system which reduces the central processing unit to central processing unit clock skew.

It is another object of the invention to provide a system which cross couples the clocks, for use by the CPUs, after each of the clocks have been delayed, to adjust for the skew between the CPU and the memory storage unit, on each side of the system.

The preferred embodiment of the invention provides a clock switch to be inserted between the delay and the central processing unit on each side of the tightly coupled system. A clock select or is added to each CPU to allow the selection of either the local or the remote clock for use by the CPU.

The clock switch on each side of the system provides a local and remote clock such that the central processing units on both sides of the system can be connected to and use the same clock. The configuration processor 9 controls the configuration of the system by providing control signals to the clock switches 50 and 81 on both sides of the system to set up the system in the desired configuration. The configuration processor 9 also provides signals to the clock select selectors 59 and 95 within each of the CPUs to control which clock each CPU 20 and 40 will receive.

An advantage of the invention is that the skew between the operating central processor units on the two sides of the system is minimized.

BRIEF DESCRIPTION OF THE DRAWINGS

The invention will be described with respect to the particular embodiments thereof and reference will be made to the drawings, in which.

DETAILED DESCRIPTION OF THE PREFERRED EMBODIMENTS

Figure 1:
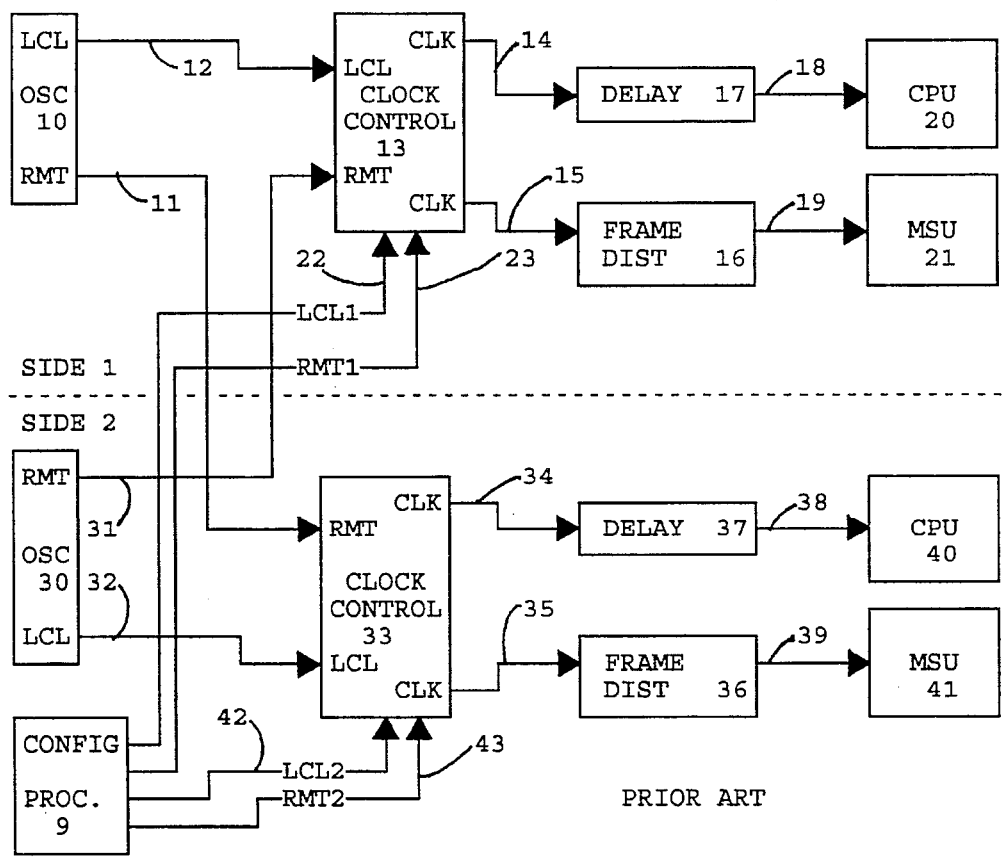
FIG. 1 is a system diagram of a prior art clock distribution system in a tightly coupled multi-processor system.
Figure 2:
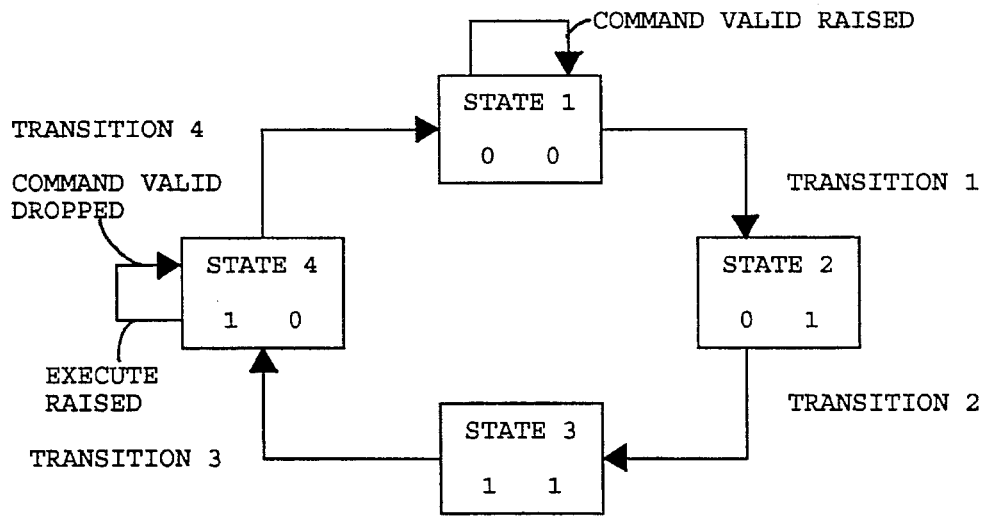
FIG. 2 is a state diagram illustrating the transitions and operation of the clock switch's state machine employed by the clock distribution system of the invention.
Figure 3:
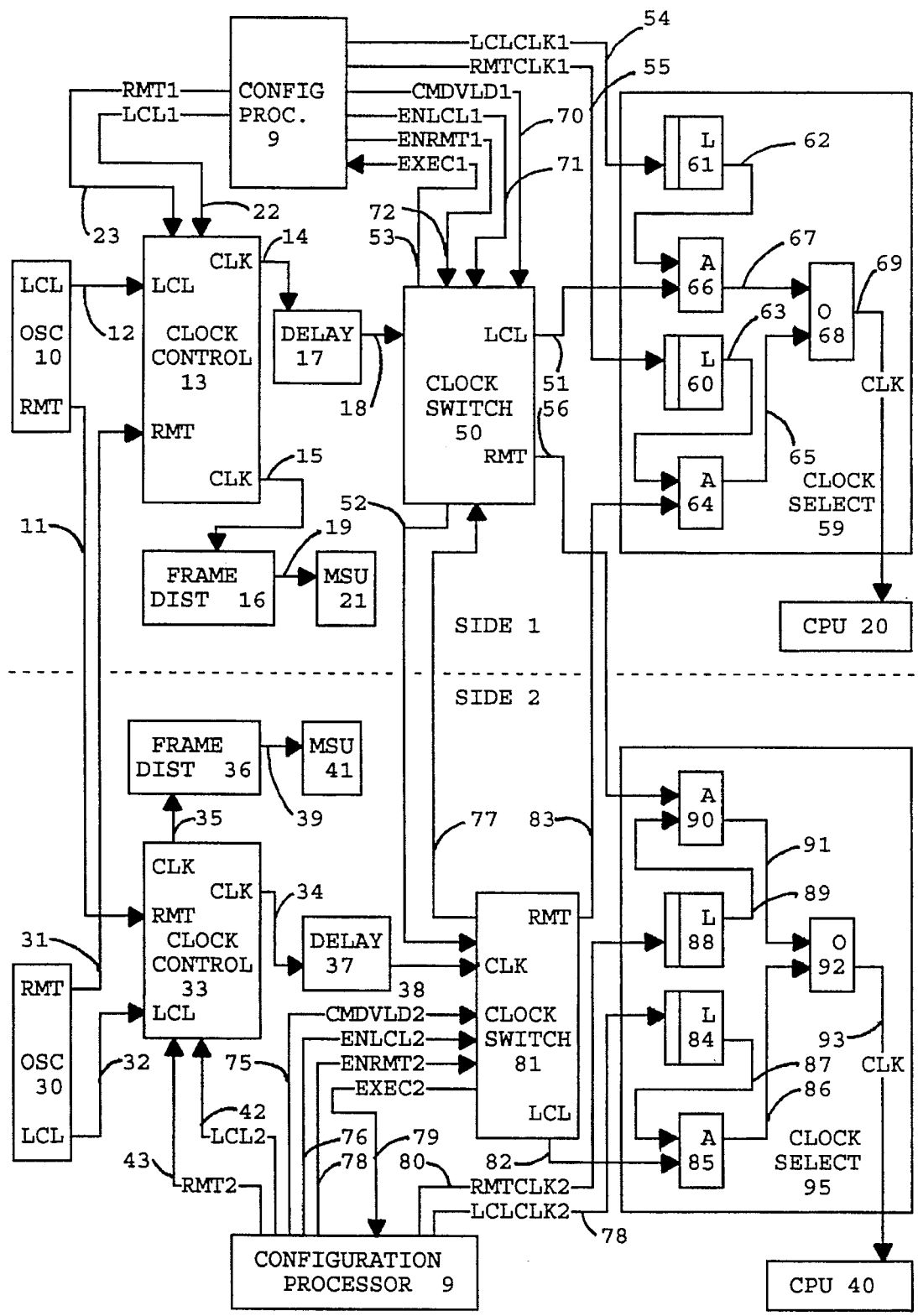
FIG. 3 is a logic diagram of the clock distribution system of the present invention.

FIG. 3 depicts the clock distribution system of the invention in a tightly coupled dual system. Comparing FIG. 3 to the prior art system of FIG. 1, a clock switch 50 has been inserted between delay 17 and CPU 20 on side 1 and a clock switch 81 has been inserted between delay 37 and CPU 40 on side 2. It should be noted that similar numbers in the figures indicate the same item. The comparison also indicates that two latches and two ANDs have been added to CPUs 20 and 40 to control which clock will be used by the CPUs 20 and 40.

Clock switch 50 receives the clock from delay 17 via line 18 and from the configuration processor 9 receives the command valid signal CMDVLD1 on line 70, the enable local clock signal ENLCL1 on line 71 and the enable remote clock signal ENRMT1 on line 72. The clock switch 50 provides a local clock on line 51, a remote clock on 56 and an executed signal EXEC1 on line 53.

Similarly, clock switch 81 receives the clock from delay 37 via line 38 and receives from the configuration processor 9 the command valid signal CMDVLD2 on line 75, the enable local clock signal ENLCL2 on line 76 and the enable remote clock signal ENRMT2 on line 78. The clock switch 81 provides a local clock on line 82, a remote clock on line 83 and an executed signal EXEC2 on line 79. A command valid signal CMDVLD1 received on line 70 by clock switch 50 will be transmitted via line 52 to clock switch 81. A command valid signal CMDVLD2 received on line 75 by clock switch 81 will be transmitted via line 77 to clock switch 50.

The local clock of clock switch 50 is connected via line 51 to AND 66 in clock selector 59. The remote clock on line 56 of clock switch 50 is connected to AND 90 in clock selector 95. Clock switch 81 local clock is connected via line 82 to AND 85 in clock selector 95. The remote clock of clock switch 81 is connected to AND 64 in clock selector 59 via line 83. Clock switches 50 and 81 are cross coupled through clock selectors 59 and 95 to CPUs 20 and 40.

Referring to clock selectors 59, configuration processor 9 controls latch 61 by the local clock control signal LCLCLK1 on line 54 and latch 60 by the remote clock control signal RMTCLK1 on line 55. Latch 61 is connected by line 62 to AND 66 and latch 60 is connected via line 63 to AND 64. The outputs of AND 66 on line 67 and AND 64 on line 65 are connected to OR 68 whose output is the clock to CPU 20 system on line 69.

Clock selector 95 has latches 88 and 84 for receiving the command signals from the configuration processor 9. A remote clock control signal RMTCLK2 is received by latch 88 via line 80 and a local clock control signal LCLCLK2 is received by latch 84 on line 78. The output of latch 88 is connected to AND 90 via line 89. The output of latch 84 is connected to AND 85 via line 87. The output of AND 90 is connected via line 91 to OR 92. The output of AND 85 is connected via line 86 to OR 92. The output of OR 92 is the clock for CPU 40 on line 93.

Figure 4:
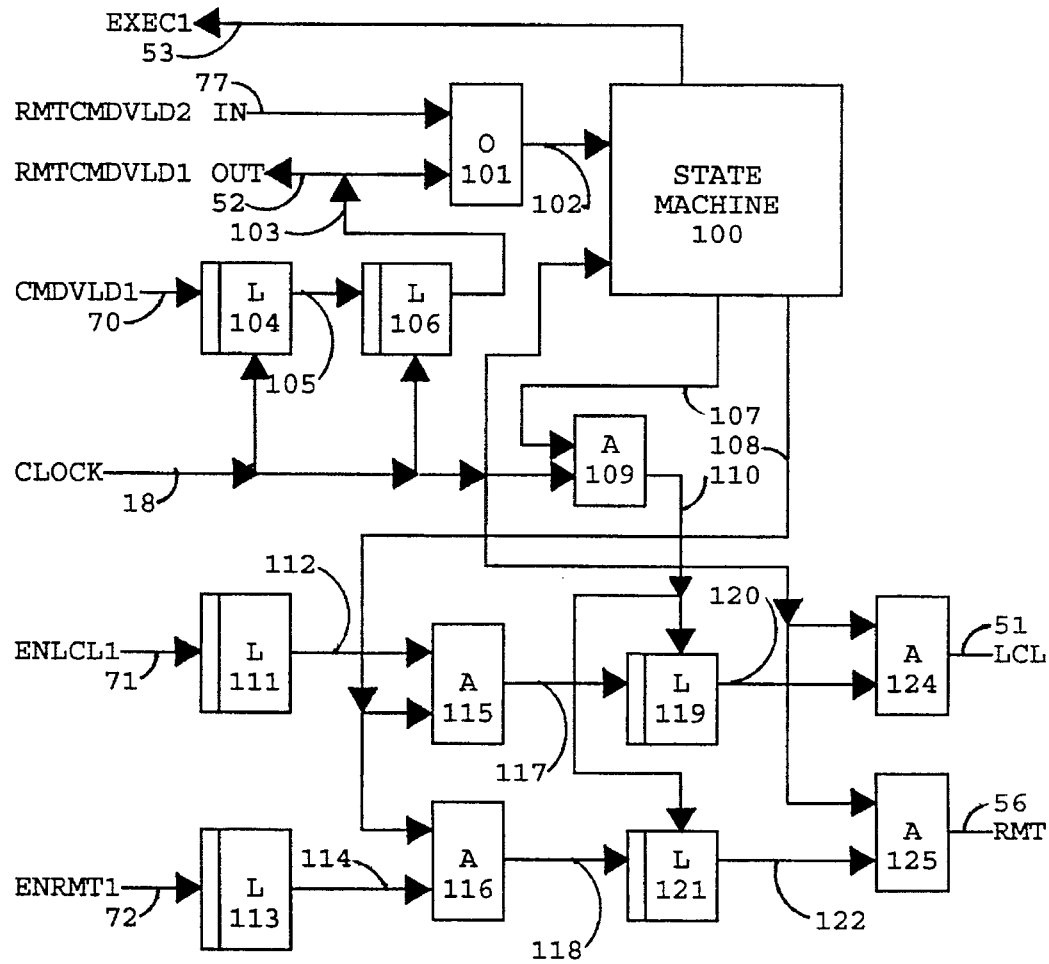
FIG. 4 is a logic diagram of a clock switch of FIG. 3.

Referring to FIG. 4, the clock switch of 50 of FIG. 3 is shown in detail. Clock switch 81 is identical to clock switch 50. The configuration processor 9 provides the command valid signal CMDVLD1 on line 70 to latch 104, the enable local clock signal ENLCL1 on line 71 to latch 111 and the enable remote clock signal ENRMT1 on line 72 to latch 113. Latch 104 is connected via line 105 to latch 106. The output of latch 106 is connected to OR 101 via line 103. The output of latch 106 also provides the remote command valid signal RMTCMDVLD1 on line 52 to the clock switch 81 of side 2. OR 101 receives the remote command valid signal RMTCMDVLD2 on line 77 from clock switch 81. OR 101 provides on line 102 a command valid signal to state machine 100 whenever a command valid signal CMDVLD1 or CMDVLD2 is generated by the configuration processor 9. Since both clock switches 50 and 81 will receive the command valid signal received by each other, the operation of the state machine 100 in each of the clock switches 50 and 81 will begin their respective processing cycles at the same time. The CLOCK on line 18 is connected to state machine 100.

Figure 5:
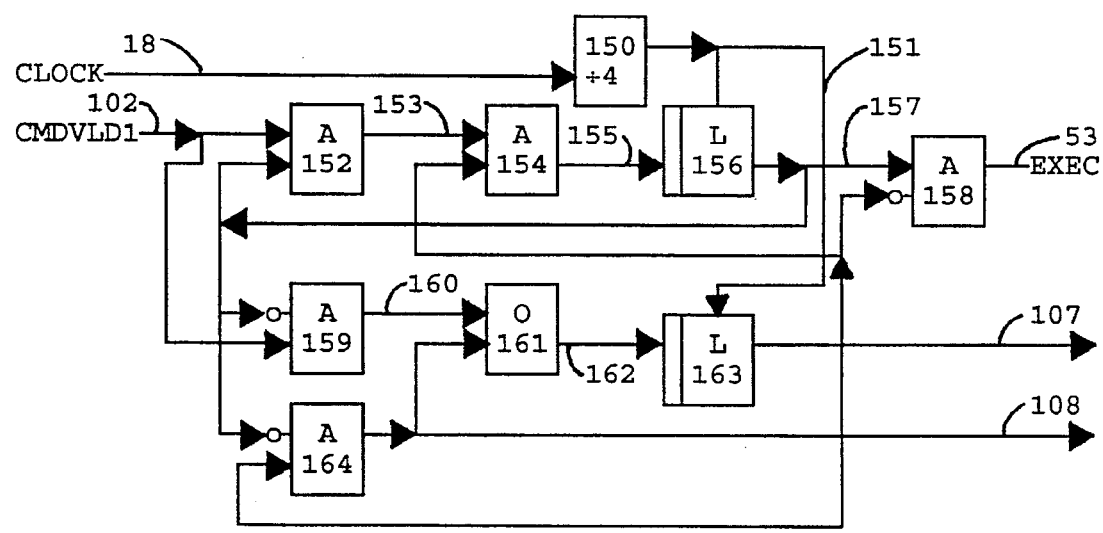
FIG. 5 is a logic diagram of the state machine of FIG. 4.

Referring to FIG. 5, a logic diagram of state machine 100 is shown. The CLOCK on line 18 is connected to divider 150 which divides the clock by four such that every fourth clock pulse on line 18 will appear on line 151. Line 151 is connected to latches 156 and 163. CMDVLD1 is connected via line 102 to inputs of ANDs 159 and 152. The output of AND 152 is connected to an input of OR 154 via line 153. The output of OR 154 is connected to the input of latch 156 via line 155. The output of latch 156 is connected via line 157 to an input of ANDs 158, 152, 159 and 164. The output of AND 159 is connected to OR 161 via line 160. The output of OR 160 is connected to the input of latch 163 via line 162. The output of latch 163 is connected via line 107 to an input of ANDs 158 and 164 and to an input of OR 154. The output of AND 164 is connected as an input of OR 161. The output of AND 158 on line 53 is the executed signal EXEC.

The state machine 100 is normally in the 00 state with latch 156 set to zero and latch 163 set to zero causing line 107 and 108 to be low. When the CMDVLD is raised on line 102, latch 163 will be set to a one by the next clock pulse appearing on line 151 placing state machine 100 in a 01 state. State 01 will cause both lines 107 and 108 to be high. The next clock pulse appearing on line 151 will cause latch 156 to be set to a one switching state machine 100 to the 11 state. State 11 will cause line 107 to be high and line 108 to be low. The next clock pulse appearing on line 151 will cause latch 163 to be set to a zero, switching state machine 100 to the 10 state. State 10 will cause both lines 107 and 108 to be low and will cause the executed signal EXEC on line 53 to be high. The configuration processor 9 will respond to the raising of EXEC on line 53 by causing CMDVAL1 on line 70 to be low. This in turn will cause line 102 to be low. The next clock pulse appearing on line 151 will set latch 156 to a zero switching state machine 100 to state 00 and causing the EXEC on line 53 to be low.

Returning to FIG. 4, output line 108 of state machine 100 is connected to ANDs 115 and 116. The outputs on lines 117 and 118 of ANDs 115 and 116 are connected to latches 119 and 121, respectively. The output of latches 119 and 121 are connected by lines 120 and 122 to ANDs 124 and 125. The output on line 107 of the state machine 100 and the clock on line 18 are both connected as inputs to AND 109. The output of AND 109 is connected to latches 119 and 121. The output of AND 124 on line 51 is the local clock provided by clock switch 50. The output of AND 125 on line 56 is the remote clock RMT provided by clock switch 50.

Referring to FIGS. 2, 3, 4 and 5, the operation of the system is as follows. The configuration processor 9 when desiring to reconfigure the system will first turn off all the clocks to the system by disabling all control signals on lines 22, 23, 42 and 43 to clock controllers 13 and 33. The conditions for the next configuration are then loaded into clock switch 50 by means of lines 71 and 72, into clock switch 81 by means of lines 76 and 78, into clock selector 59 in CPU 20 by means of lines 54 and 55 and into clock selector 95 in CPU 40 by means of lines 78 and 80. For a dual sided configuration, latches 61, 60, 88 and 84 are all set to a one. For a single sided configuration, latches 61 and 84 are set to a one and latches 60 and 88 are set to a zero. In some instances it may be required to run only CPU 40 from clock switch 50. In this configuration latch 88 will be set to a one and latches 60, 61 and 84 will be set to zero. For the configuration of clock switch 81 providing a clock only to CPU 20, then latch 60 will be set to a one and latches 61, 88 and 84 will be set to a zero. After the foregoing is accomplished, the selected configuration is then sent to clock controller 13 by means of lines 22 and 23 and to clock controller 33 by means of lines 42 and 43. This action will effectively select the oscillator to be used by both sides of the system and connect the selected clock outputs of the oscillators to clock controllers 13 and 33 whereby the clock for both sides of the system are turned on.

The configuration processor 9 then issues a command valid signal CMDVLD1 or 2 on either line 70 or 75 which is stored in latch 104 within clock switch 50 and a similar latch in clock switch 81. The remaining discussion will be directed to clock switch 50 as shown in FIG. 4 and it should be understood that the same process is taking place at the same time in clock switch 81. Assuming that the command valid signal was issued to side 1 of the system, then the command valid signal CMDVLD1 will have been stored in latch 104. The next clock pulse on line 18 will transfer the contents of latch 104 into latch 106. The output of latch 106 is sensed through OR 101 by AND 152 in state machine 100 and transmitted as a RMTCMDVLD1 signal on line 52 to clock switch 81.

The next clock pulse appearing on line 151 will switch machine 100 from state 00 to state 01. The high output on line 107 will allow clock pulses on line 18 to appear on line 110. The high output on line 108 will be sensed by ANDs 115 and 116 causing lines 117 and 118 to be low. The next clock pulse appearing on line 110 will transfer the low conditions of lines 117 and 118 into latches 119 and 121 which in turn will turn off ANDs 124 and 125 resulting in the local clock and remote clock of clock switch being shut off. It should be realized that at this time the clock is shut off to the CPUs but not to the master storage units 21 and 41.

The next clock pulse appearing on line 151 will switch state machine 100 from the 01 state to the 11 state. ANDs 115 and 116 are now conditioned such that the states of latches 111 and 113 are felt on lines 117 and 118 and stored into latches 119 and 121 by a clock pulse on line 110. The conditions of latches 119 and 121 control the condition of ANDs 124 and 125 thereby turning on the local clock and remote clock for clock switch 50 in accordance with the settings of latches 111 and 113 by the configuration processor 9. At this time the clock to the CPUs is turned on.

The next clock pulse appearing on line 151 will cause the state machine 100 to switch from state 11 to state 10 causing executed signal EXEC1 on line 53 to be high. In response to a high executed signal EXEC1 on line 53, the configuration processor 9 will remove the command valid signal CMDVLD1 which will cause state machine 100 to be switched from state 10 to state 00 and the executed signal to be low thereby completing the reconfiguration process.

The primary system configurations are either (1) the local clock of clock switch 50 is connected to central processing unit 20 and the local clock of clock switch 81 is connected to central processing unit 40; (2) the tightly coupled connection of the local clock of clock switch 50 connected to central processing unit 20 and the remote clock of clock switch 50 connected to central processing unit 40; or (3) the tightly coupled connection of the local clocks of clock switch 81 connected to central processing unit 81 and the remote clock of clock switch 81 connected to central processing unit 50.

The above-described embodiment of the invention described the system for selecting and providing a clock to the central processing units in a tightly coupled dual sided system such that the clock skew between the two tightly coupled central processing units will be reduced.

While the invention has been particularly shown and described with reference to the preferred embodiments thereof, it will be understood by those skilled in the art that changes in form and detail may be made therein without departing from the spirit and scope of the invention. Given the above disclosure of general concepts and specific embodiments, the scope of protection sought is defined by the following claims.

What is claimed is:

1. A clock distribution system for reducing clock skew between tightly coupled central processing units in a multi-processor system where said multi-processor system includes a configuration processor for generating a plurality of configuration signals including a first configuration signal and a second configuration signal, a first clock for generating a first local clock and a first remote clock, a second clock for generating a second local clock and a second remote signal, a first processor having a first central processing unit and a first master storage unit, a second processor having a second central processing unit and a second master storage unit, a first clock controller for generating a first delayed clock signal from said first local clock or said second remote clock in accordance with said configuration signals and a second clock controller for generating a second delayed clock signal from said first remote clock or said second local clock in accordance with said configuration signals, said clock distribution system comprising:

distribution means connected to said configuration processor, said first clock controller and said second clock controller for receiving said first delayed clock signal, said second delayed clock signal and said configuration signals and for distributing in accordance with said configuration signals either (1) said first delayed clock to said first central processing unit and said second delayed clock to said second central processing unit, or (2) said first delayed clock signal to both said first and said second central processing unit, or (3) said second delayed clock signal to both said first and said second central processing unit.

2. The clock distribution signal of claim 1 comprising:

a first clock switch connected to said configuration processor, said first clock controller and said second clock controller for receiving said first delayed clock signal and generating therefrom a local clock signal for said first central processing unit and a remote clock signal for said second central processing unit as a function of said configuration signals;

a second clock switch connected to said configuration processor, said first clock controller and said second clock controller for receiving said second delayed clock signal and for generating therefrom a local clock signal for said second central processing unit and a remote clock signal for said first central processing unit as a function of said configuration signals;

a first clock selector connected to said configuration processor, to said first clock switch and to said second clock switch for selecting between said local clock signal from said first clock switch and said remote clock signal from said second clock switch in response to said configuration signals and for providing a selected clock signal to said first central processing unit; and a second clock selector connected to said configuration processor, to said first clock switch and to said second clock switch for selecting between said local clock signal from said second clock switch and said remote clock signal from said first clock switch as a function of said configuration signals and for providing a selected clock signal to said second central processing unit.

3. The clock distribution system of claim 2 wherein:

said first clock switch includes a first timing means for controlling the sequence of operation of said first clock switch; and said second clock switch includes a second timing means for controlling the sequence of operation of said second clock switch.

4. The clock distribution system of claim 3 wherein:

said first clock switch generates a first remote signal in response to receiving said first configuration signal; and said second clock switch generates a second remote signal in response to receiving said second configuration signal.

5. The clock distribution system of claim 4 wherein:

said first timing means is connected to said configuration processor, said first clock switch and said second clock switch and begins a sequence of operation of said first clock switch in response to said first configuration signal or said second remote signal; and said second timing means is connected to said configuration processor, said first clock switch and said second clock switch and begins a sequence of operation of said second clock switch in response to said second configuration signal or said first remote signal.

6. The clock distribution system of claim 5 wherein:

said first timing means comprises a first state machine for controlling the sequence of operation of said first clock switch; and said second timing means comprises a second state machine for controlling the sequence of operation of said second clock switch.

7. The clock distribution system of claim 6 wherein:

said first state machine is connected to said configuration processor, said first clock switch and said second clock switch and is responsive to every nth clock cycle of said first delayed clock signal after said first clock switch receives either said first configuration signal or said second remote signal; and said second state machine is connected to said configuration processor, said first clock switch and said second clock switch and is responsive to every nth clock cycle of said second delayed clock signal after said second clock switch receives either said second configuration signal or said first remote signal.

8. A multi-processor system having reduced clock skew between tightly coupled central processing units within said system, said system comprising:

a configuration processor for controlling the system configuration of a first processor and a second processor within said system and said configuration processor provides a plurality of configuration signals including a first configuration signal and a second configuration signal;

said first processor including a first central processing unit and a first master storage unit;

said second processor including a second central processing unit and a second master storage unit;

a first clock for generating a first local clock signal and a first remote clock signal;

a second clock for generating a second local clock signal and a second remote clock signal;

a first clock controller connected to said configuration processor and to said first and second clock for selecting between said first local clock signal and said second remote clock signal as a function of said configuration signals and for providing a selected clock signal to said first master storage unit and for generating a delayed first processor clock signal;

a second clock controller connected to said configuration processor and to said first and second clock for selecting between said second local clock signal and said first remote clock signal as a function of said configuration signals and for providing a selected clock signal to said second master storage unit and for generating a delayed second processor clock signal;

a first clock switch connected to said configuration processor and to said first clock controller for receiving said first processor clock signal and for generating therefrom a first local processor clock signal for said first central processing unit and a first remote processor clock signal for said second central processor unit as a function of said configuration signals;

a second clock switch connected to said configuration processor and to said second clock controller for receiving said second processor clock signal and for generating therefrom a second local processor clock signal for said second central processing unit and a second remote processor clock signal for said first central processing unit as a function of said configuration signals;

a first clock selector connected to said first and second clock switches for selecting between said first local processor clock signal and said second remote processor clock signal as a function of said configuration signals and for providing a selected clock signal to said first central processing unit; and a second clock selector connected to said first and second clock switches for selecting between said second local processor clock signal and said first remote processor clock signal as a function of said configuration signals and for providing a selected clock signal to said second central processing unit.

9. The multi-processor system of claim 8 wherein:

said first clock switch includes a first timing means for controlling the sequence of operation of said first clock switch; and said second clock switch includes a second timing means for controlling the sequence of operation of said second clock switch.

10. The clock distribution system of claim 9 wherein:

said first clock switch is connected to said configuration processor and to said second clock switch for generating a first remote signal in response to receiving said first configuration signal; and said second clock switch is connected to said configuration processor and to said first clock switch for generating a second remote signal in response to receiving said second configuration signal.

11. The clock distribution system of claim 10 wherein:

said first timing means is connected to said configuration processor and to said second clock switch and begins the sequence of operation of said first clock switch in response to said first configuration signal or said second remote signal; and said second timing means is connected to said configuration processor and to said first clock switch and begins the sequence of operation of said second clock switch in response to said second configuration signal or said first remote signal.

12. The clock distribution system of claim 11 wherein:

said first timing means comprises a first state machine for controlling the sequence of operation of said first clock switch; and said second timing means comprises a second state machine for controlling the sequence of operation of said second clock switch.

13. The clock distribution system of claim 12 wherein:

said first state machine is connected to said configuration processor and to said second clock switch and is responsive to every nth clock cycle of said first processor clock signal after said first clock switch receives either said first configuration signal or said second remote signal; and said second state machine is connected to said configuration processor and to said first clock switch and is responsive to every nth clock cycle of said second processor clock signal after said second clock switch receives either said second configuration signal or said first remote signal.

\* \* \* \* \*